United States Patent [19]

Held

[11] Patent Number: 5,325,426

[45] Date of Patent: Jun. 28, 1994

[54] METHOD FOR OVERLOAD PREVENTION IN A SWITCHING CENTER OF A COMMUNICATIONS NETWORK

[75] Inventor: Walter Held, Geretsried, Fed. Rep. of Germany

[73] Assignee: Siemens Aktiengesellschaft, Munich, Fed. Rep. of Germany

[21] Appl. No.: 864,212

[22] Filed: Apr. 6, 1992

[30] Foreign Application Priority Data

Apr. 23, 1991 [EP] European Pat. Off. ......... 91106528.2

[51] Int. Cl.$^5$ .......................... H04M 3/36; H04M 3/38
[52] U.S. Cl. .................................. 379/337; 379/243; 379/220
[58] Field of Search ............... 379/113, 137, 138, 241, 379/243, 244, 266, 209, 309, 384, 220, 337

[56] References Cited

U.S. PATENT DOCUMENTS

| | | | |
|---|---|---|---|
| 3,517,123 | 6/1970 | Harr et al. | 379/113 |
| 3,700,822 | 10/1972 | Fritschi | 379/241 |
| 4,199,665 | 4/1980 | Emrick et al. | 379/243 |
| 4,497,979 | 2/1985 | Phelan | 379/244 |
| 4,658,098 | 4/1987 | Wegmann | 379/113 |
| 4,802,205 | 1/1989 | Eder et al. | 379/113 |
| 4,860,344 | 8/1989 | Jans et al. | 379/113 |
| 4,907,256 | 3/1990 | Higuchi et al. | 379/113 |
| 5,060,258 | 10/1991 | Turner | 379/137 |

FOREIGN PATENT DOCUMENTS 0213382 11/1987 European Pat. Off. .
0213408 11/1987 European Pat. Off. .

OTHER PUBLICATIONS

Article "EWSD" from Siemens AG, pp. 1-20. (Document A30808-X2717-X-2-18) Jun. 26, 1989.

*Primary Examiner*—James L. Dwyer
*Assistant Examiner*—Daniel S. Hunter
*Attorney, Agent, or Firm*—Hill, Steadman & Simpson

[57] ABSTRACT

Method for overload prevention in a switching center of a communication network. For optimizing the overload prevention of a switching center, the operating personnel assign fixed priority levels bundle-by-bundle to the ports of the trunks. Since this allocation is often implemented in an unprofessional manner, the behavior of the switching center is correspondingly unfavorable in case of an overload. In order to avoid this problem, the priority levels for ports of trunks are automatically assigned by the software of the switching center in accordance with the method for overload prevention.

12 Claims, 2 Drawing Sheets

METHOD FOR OVERLOAD PREVENTION IN A SWITCHING CENTER OF A COMMUNICATIONS NETWORK

BACKGROUND OF THE INVENTION

When the traffic volume, i.e. the number of call attempts rises above the maximum capacity of a switching center, then the offered load (rate of call attempts) can no longer be handled with the necessary speed and an overload of the switching center occurs.

In order to prevent overload in a switching center, some of the call attempts that come from outside the switching center (incoming call attempts) must be rejected. The rejection of the call attempts should thereby be implemented gradually according to the existing overload, i.e., call attempts are increasingly rejected as the overload increases in the switching center. Every processing request to the controller of the switching center that arrives from outside the switching center is to be considered an incoming call attempt.

According to the specification EWSD, Overload handling, A30808-X2717-X-2-7618 of Siemens AG, it is known to control overload prevention using seven overload levels, whereby overload level 0 denotes that all call attempts are accepted and overload level 6 denotes that only 0% through 5% (residual acceptancy) of the incoming call attempts are accepted.

An equal distribution is desired therebetween, i.e. when the overload level rises by one level, approximately 16% fewer call attempts are accepted.

Every port which is equipped with a subscriber line or a trunk has one of seven possible priority levels allocated to it. Priority level 0 is thereby equivalent to the lowest priority and priority level 6 is equivalent to the highest priority.

A call attempt is rejected when the priority level of the appertaining port is lower than the overload level of the switching center.

A distinction is made in the case of the subscriber lines between prioritized and non-prioritized subscriber lines. The non-prioritized subscriber lines (normal subscriber lines) are uniformly divided between the four priority levels 0 through 3. The division occurs automatically on the basis of a linkage of the port address with the time of day. These ports cyclically change their affiliation to priority level approximately every thirty seconds according, for example, to the following sequence:

0→1→2→3 thus each of these normal ports, is in priority levels 0, 1, 2 and 3 with equal frequency over a time span that is significantly longer than thirty seconds.

Fixed-priority ports are identified as such by what is referred to as a MML command and have priority level 5 allocated to them. The MML command represents a command of the operating program of the switching center and is input by the operating personnel of the communication network. Call attempts from subscribers having a fixed-priority port are only rejected given an extremely high overload (overload level 6).

The priority levels of the ports of trunks are fixed, i.e. are chronologically invariable, and are allocated thereto bundle-by-bundle by the MML command, i.e., the ports of a specific bundle of trunks all have the same priority.

The priority levels of the bundles are thereby assigned according to network parameters. In local offices and local transit switching centers, the priority levels 3 through 6 are used for trunk bundles. The trunk bundles are distributed over priority levels 0 through 6 for exclusive long-distance and transit switching centers.

Unfortunately, the type of assigning for the priority levels of trunk bundles by the operating personnel of the switching center operator, is often unprofessionally implemented, or sometimes not even at all. This has a correspondingly negative effect on the behavior of the switching center in case of an overload.

SUMMARY OF THE INVENTION

It is an object of the present invention to provide a method for overload prevention wherein the assigning of priority levels for trunk bundles is avoided.

In general terms the method of the present invention is a method for overload prevention in a switching center of a communication network, wherein:

(a) a momentary overload level is calculated for the switching center from what are referred to as overload indicators for indicting the traffic volume of the components of the switching center, (b) the port of a subscriber line is handled in conjunction with incoming call attempts in accordance with an allocated priority level, (c) the allocation of the priority levels normally occurs cyclically, in that the priority level of such a port is incremented at predetermined time intervals until the cycle starts over at the lowest priority level of the cycle, (d) a comparison of the momentary priority level of the port to the momentary overload level of the switching center is implemented at an occupancy attempt, (e) a call attempt of such a port is rejected when the comparison shows that the momentary overload level is higher than the momentary priority level of the port, (f) the port of a normal trunk for incoming call attempts is likewise treated as a cyclically prioritized port, and (g) the priority level of the cyclically prioritized port of a trunk is elevated by at least one level on a chronological average in comparison to the priority level of the cyclically prioritized port of a subscriber line.

In a further advantageous development of the present invention a small portion of the ports of the trunks has fixed-priority of a highest priority level for special purposes such as emergency call equipment or transitions to military communication networks. This has the advantage that a call set-up for which a plurality of switching equipment have already been seized can be completed as a consequence of higher priority. Furthermore, the port of a trunk for incoming call attempts can be handled like a port having a chronologically invariable, high priority level given a descending call set-up direction with respect to the hierarchy of the switching stage.

The following advantages are achieved with the present invention:

(1) The operating personnel during operation of the switching center as well as unburdening the installation personnel at the initial assigning of the priority levels upon initialization of the switching center are not burdened.

(2) Even given extremely high overload, entire trunk bundles and, thus, private branch exchanges are no longer blanked out as a consequence of the uniform distribution of different priority levels within a trunk bundle. This is of great significance particularly in small switching centers having few trunk bundles or in private branch exchanges.

(3) Every normal subscriber connected to a switching center has the chance of placing a call (for example, emergency call) even given a high overload of his switching center.

(4) There are shorter waiting times for patient subscribers.

(5) There is a better handling of the overload prevention mechanisms since all ports of a switching center are uniformly distributed on to the individual priority levels.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

The invention itself as well as the environment within which the invention is implemented shall be set forth in greater detail below.

Equipment for overload prevention provides that repetitions of call attempts will not increase in case of overload within the switching center, i.e. that blind load does not displace the useful load of the switching center.

In order to recognize the overload in a graduated fashion, equipment is provided that recognizes that extent of the overload (overload level) on the basis of a plurality of so-called overload indicators.

As an overload indicator of the central controller, for example, the duration of the reaction of the central controller of the switching center to a message of a peripheral controller can be measured in the line/trunk group of the switching center. For example, the quantity of used data blocks in the available data memory of the peripheral controller and/or the level of back-up in the input/output buffers of the peripheral controller can serve as overload indicators of a peripheral controller of the switching center.

Figure 1:
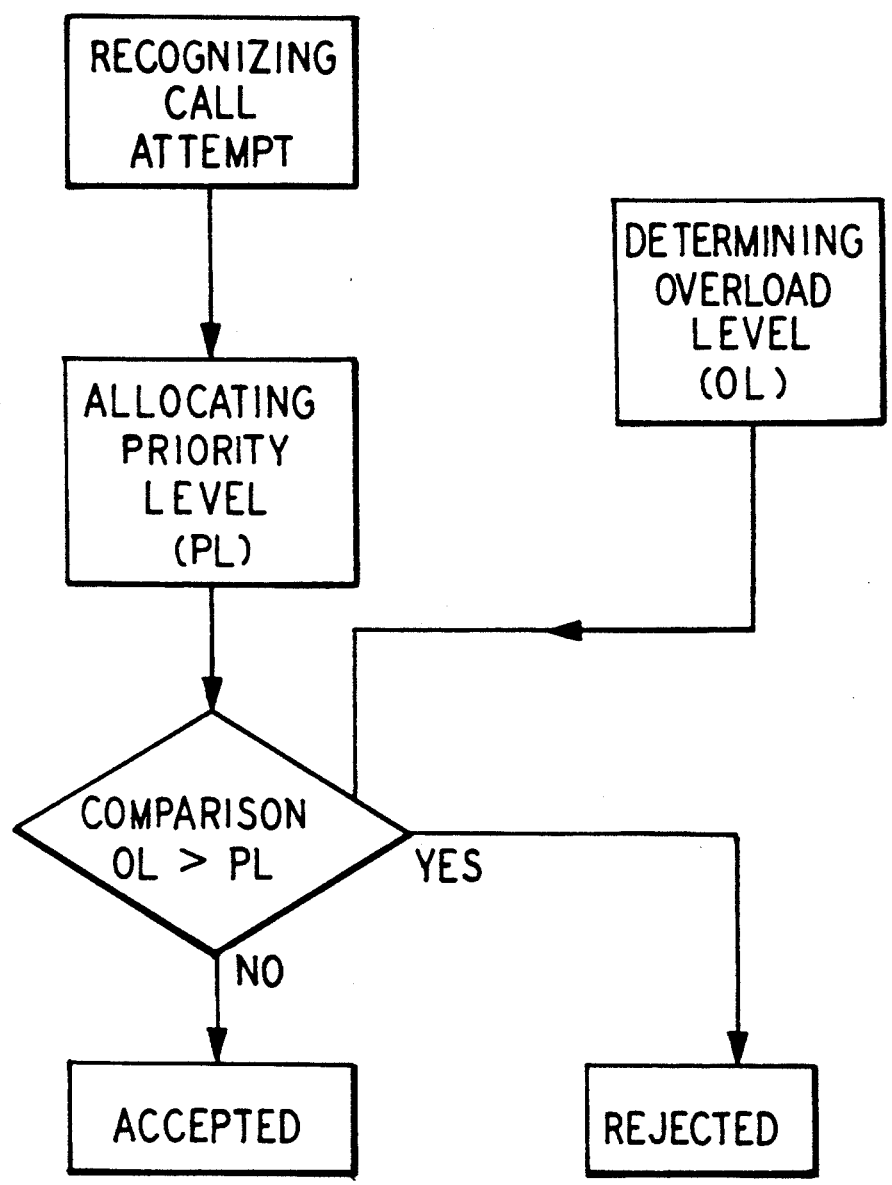
FIG. 1 is a flowchart of the method of the present invention.

The overload level of the switching center is calculated from the overload indicators, this overload level being utilized as a comparison standard for a decision regarding acceptance or rejection of call attempt. When the momentary priority level of a port is lower than the momentary overload level of the switching center, than call attempt is rejected, whereas it is otherwise accepted and properly handled. It follows therefrom that a greater or lesser number of incoming call attempts are rejected dependent on the overload level of the switching center. The method of the present invention is illustrated by the flowchart depicted in FIG. 1.

The principle of the present invention is that the ports of normal trunks are handled like cyclically prioritized ports given incoming call attempts. This means that the priority levels for trunks that are not fixed-priority (normal trunks) are automatically assigned by the software of the respective line/trunk group of the switching center without the operating personnel of the operator of the switching network having to assign them.

The priority levels are generally uniformly distributed over the priority levels 1 through 5 by means of port addresses and time of day without discrimination between the type of switching center. Just as in the case of the normal subscriber lines, the ports of the normal trunks change their affiliation to priority levels within a cycle of approximately 30 seconds according, for example, to the following sequence:

1→2→3→4→5

In order to shorten the waiting time of patient subscribers waiting for a dial tone, their subscriber ports are no longer distributed over priority levels 0 through 3 but rather over priority levels 0 through 4. The cyclical change of the priority levels is retained.

Figure 2:
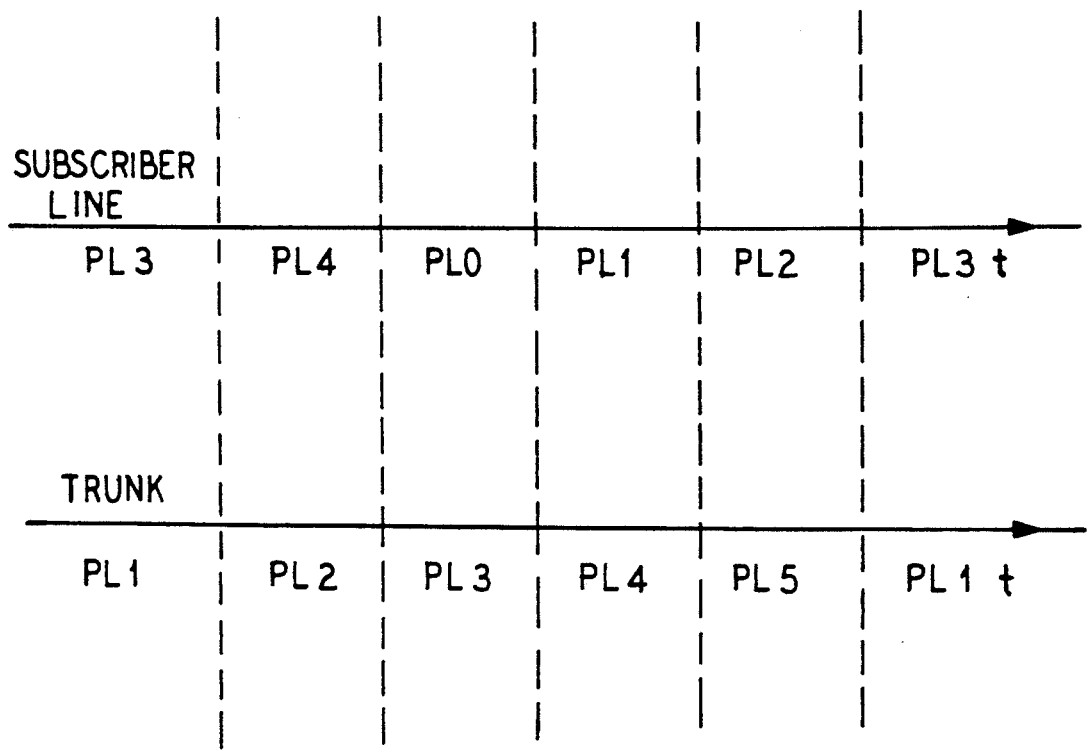
FIG. 2 depicts the cyclical change of trunks and subscriber lines.

The cyclically prioritized ports of the trunks are thus elevated by one priority level on a chronological average in comparison to those of the subscriber lines. FIG. 2 depicts the cyclical change for the trunks and subscriber lines. This is done because, first, the call attempts via trunks are preceded by call attempts via subscriber lines or trunks that has already been accepted, i.e. switching equipment have already been seized and because, second, subscribers waiting for a dial tone given overload produce a greater offering pressure than occupancy attempts arriving via trunks from other switching centers, since these call attempts do not continue to exist upon rejection as in the case of waiting subscribers.

Fixed-priority trunks are only established with the assistance of MML commands for special purposes, for example for trunks to emergency call equipment or for transitions into military communication networks. These fixed-priority trunks are assigned only priority level 6. No more than 5% of the trunks of a line/trunk group should thereby have fixed priority in order to keep the overload prevention functional.

The priority level 0 remains unwired in exclusive transit switching centers that have only trunks. This does not have a negative influence on the overload prevention at the beginning of an overload situation since the overload prevention generally starts with overload level 3 upon recognition of an overload situation. The defense against a renewed increase in the overload is merely delayed by approximately one second in case a brief return to overload level 0 is undertaken during an existing overload situation. The defense can then only occur when overload level 2 is reached.

Compared to the earlier methods, simulations implemented with the method of the present invention produced a more uniform handling of subscriber lines and trunks, a clearly lower, average waiting time of patient subscribers and shorter queue lengths or, respectively, waiting durations in the job list of the peripheral controllers when taking all accepted call attempts into consideration.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for overload prevention in a switching center having ports for subscriber lines and trunks of a communication network, comprising the steps of:
   (a) calculating a momentary overload level for the switching center from overload indicators for indicating traffic volume of components of the switching center;
   (b) handling a port of a subscriber line in conjunction with incoming call attempts in accordance with an allocated priority level;
   (c) cyclically allocating the priority levels to the port of the subscriber line, in that the priority level of the port of the subscriber line is incremented at predetermined time intervals with a lowest priority level following a highest priority level in the cycle;
   (d) implementing a comparison of the momentary priority level of the port of the subscriber line to the momentary overload level of the switching center for call attempt;
   (e) rejecting the call attempt of the port of the subscriber line when the comparison indicates that the momentary overload level is higher than the momentary priority level of the port of the subscriber line;
   (f) also treating a port of a normal trunk for incoming call attempts as a cyclically prioritized port; and
   (g) elevating the priority level of the cyclically prioritized port of a trunk by at least one priority level on a chronological average in comparison to the priority level of the cyclically prioritized port of a subscriber line.

2. The method according to claim 1, wherein a small number of the ports of the trunks have fixed-priorities with the highest priority level for special purpose.

3. The method according to claim 1, wherein the method further comprises treating the port of a trunk for incoming call attempts, that come from an exchange ranking higher in a routing hierarchy, as permanently prioritized ports having a high priority level.

4. The method according to claim 2, wherein the special purpose is for trunks connected to emergency call equipment.

5. The method according to claim 2, wherein the special purpose is for transition to military communication networks.

6. Method for overload prevention in a switching center having ports for subscriber lines and trunks of a communication network, comprising the steps of:
   (a) providing at least one overload indicator that is indicative of traffic volume of at least one component of the switching center;
   (b) calculating a momentary overload level for the switching center from the at least one overload indicator;
   (c) cyclically allocating priority levels to at least some of the ports of the subscriber lines and to at least some of the ports of the trunks such that a priority level of a respective port is incremented at predetermined time intervals to a next higher priority level with a lowest priority level following a highest priority level;
   (d) elevating the priority level of the at least some of the ports of the trunks by at least one priority level on a chronological average in comparison to the priority level of the at least some of the ports of the subscriber lines;
   (e) comparing a momentary priority level of a respective port of the at least some of the subscriber lines or of the at least some of the trunks to the momentary overload level of the switching center for call attempt thereof; and
   (f) rejecting the call attempt of the respective port when the comparison indicates that the momentary overload level is higher than the momentary priority level of the respective port.

7. The method according to claim 6, wherein the at least some of the ports of the subscriber lines are cyclically allocated priority levels in the range of 0 to N, where N is a whole number, and wherein the at least some of the ports of the trunks are cyclically allocated priority levels in the range of 1 to N+1.

8. The method according to claim 6, wherein a small number of the ports of the trunks are permanently assigned the highest priority level for special purposes.

9. The method according to claim 6, wherein the method further comprises treating the port of a trunk for incoming call attempts, that come from an exchange ranking higher in a routing hierarchy, as permanently prioritized ports having a high priority level.

10. Method for overload prevention in a switching center having ports for subscriber lines and trunks of a communication network, comprising the steps of:
    (a) providing at least one overload indicator that is indicative of traffic volume of at least one component of the switching center;
    (b) calculating a momentary overload level for the switching center from the at least one overload indicator;
    (c) cyclically allocating priority levels to at least some of the ports of the subscriber lines and to at least some of the ports of the trunks such that a priority level of a respective port is incremented at predetermined time intervals to a next higher priority level with a lowest priority level following a highest priority level;
    (d) elevating the priority level of the at least some of the ports of the trunks by at least one priority level on a chronological average in comparison to the priority level of the at least some of the ports of the subscriber lines, such that the at least some of the ports of the subscriber lines being cyclically allocated priority levels in the range of 0 to N, where N is a whole number, and the at least some of the ports of the trunks being cyclically allocated priority levels in the range of 1 to N+1;
    (e) comparing a momentary priority level of a respective port of the at least some of the subscriber lines or of the at least some of the trunks to the momentary overload level of the switching center for a call attempt thereof; and
    (f) rejecting the call attempt of the respective port when the comparison indicates that the momentary overload level is higher than the momentary priority level of the respective port.

11. The method according to claim 10, wherein a small number of the ports of the trunks are permanently assigned the highest priority level for special purposes.

12. The method according to claim 10, wherein the method further comprises treating the port of a trunk for incoming call attempts, that come from an exchange ranking higher in a routing hierarchy, as permanently prioritized ports having a high priority level.

* * * * *